(12) United States Patent
Brosowske

(10) Patent No.: US 7,335,107 B2
(45) Date of Patent: Feb. 26, 2008

(54) TORSIONAL COUPLING

(75) Inventor: Thomas Alan Brosowske, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 48 days.

(21) Appl. No.: 10/927,317

(22) Filed: Aug. 27, 2004

(65) Prior Publication Data

US 2006/0046859 A1   Mar. 2, 2006

(51) Int. Cl.
*F16D 3/80* (2006.01)
(52) U.S. Cl. .................................... 464/27; 464/62.1
(58) Field of Classification Search ............ 192/55.1, 192/56.1, 56.3, 71; 464/10, 37, 62.1, 24, 464/25, 27, 28
See application file for complete search history.

(56) References Cited

U.S. PATENT DOCUMENTS

| | | | |
|---|---|---|---|
| 1,235,130 A | 7/1917 | Fuchs | |
| 1,272,061 A | 7/1918 | Lake | |
| 1,734,267 A | 11/1929 | Moorhouse | |
| 1,943,517 A | 1/1934 | Daukus | |
| 2,028,459 A | 1/1936 | Kjær | |
| 2,028,903 A | 1/1936 | Griswold | |
| 2,196,716 A * | 4/1940 | Williams | 464/62.1 |
| 2,408,501 A * | 10/1946 | Wright | 464/27 X |
| 2,451,513 A | 10/1948 | Salomon | |
| 2,477,175 A | 7/1949 | Gee | |
| 2,628,486 A * | 2/1953 | Huff | 464/27 |
| 2,764,003 A | 9/1956 | Croset | |
| 2,834,213 A | 5/1958 | Fredericks | |
| 2,848,883 A * | 8/1958 | Dall'olio | 192/56.1 X |
| 2,873,590 A | 2/1959 | Croset | |
| 2,932,276 A * | 4/1960 | Fry, Jr. | 192/56.3 X |
| 3,008,313 A | 11/1961 | Mehlitz | |
| 3,246,485 A | 4/1966 | Chapman | |
| 3,575,014 A | 4/1971 | Wright | |
| 3,620,044 A | 11/1971 | Latour | |
| 3,650,125 A | 3/1972 | Phillips | |
| 3,803,935 A | 4/1974 | Nozawa | |
| 4,002,043 A | 1/1977 | Yoshida | |
| 4,112,785 A | 9/1978 | Brobeck | |
| 4,160,390 A | 7/1979 | Spaetgens | |

(Continued)

FOREIGN PATENT DOCUMENTS

EP    0586973 B1    3/1994

*Primary Examiner*—Greg Binda
(74) *Attorney, Agent, or Firm*—Finnegan, Henderson, Farabow, Garrett & Dunner

(57) ABSTRACT

A torsional coupling includes a body having a circumference and defining a center axis. The body is rotatable about the center axis. The coupling also includes a ring including an inner diameter disposed about the circumference. The ring includes a ring contact surface having a first radius and the ring is configured to rotate about the center axis. A coupling element is associated with the body and is configured to apply a centrifugal force radially outwardly from the circumference of the body when the body rotates. The coupling element includes a coupling element contact surface having a second radius which is different than the first radius of the ring contact surface. The coupling element contact surface is in contact with the ring contact surface and is configured to apply a force against the ring contact surface to rotate the ring relative to the body and increase the effective stiffness of the torsional coupling as the rotational speed of the body increases.

12 Claims, 5 Drawing Sheets

U.S. PATENT DOCUMENTS

| | | | |
|---|---|---|---|
| 4,580,456 A | 4/1986 | Takano | |
| 4,611,701 A | 9/1986 | Friedmann | |
| 4,681,199 A | 7/1987 | Maucher et al. | |
| 4,901,596 A | 2/1990 | Reik et al. | |
| 4,944,377 A * | 7/1990 | Elsner | 192/56.3 |
| 5,045,027 A | 9/1991 | Larsen | |
| 5,090,532 A * | 2/1992 | Bich | 464/37 |
| 5,120,276 A | 6/1992 | Maucher et al. | |
| 5,123,877 A | 6/1992 | Maucher et al. | |
| 5,151,065 A | 9/1992 | Maucher et al. | |
| 5,156,067 A | 10/1992 | Umeyama | |
| 5,180,044 A | 1/1993 | Fukushima et al. | |
| 5,180,335 A | 1/1993 | Maucher et al. | |
| 5,245,889 A | 9/1993 | Kohno et al. | |
| 5,249,659 A | 10/1993 | Fukushima | |
| 5,269,198 A | 12/1993 | Fukushima | |
| 5,269,725 A | 12/1993 | Maucher et al. | |
| 5,272,937 A | 12/1993 | Brosowske et al. | |
| 5,303,681 A | 4/1994 | Crofts | |
| 5,307,710 A | 5/1994 | Feldhaus et al. | |
| 5,352,157 A | 10/1994 | Ochs et al. | |
| 5,353,664 A | 10/1994 | Yamamoto | |
| 5,367,921 A | 11/1994 | Fukushima | |
| 5,456,634 A | 10/1995 | Maucher et al. | |
| 5,569,087 A | 10/1996 | Yamamoto | |
| 5,573,460 A | 11/1996 | Toji | |
| 5,582,076 A | 12/1996 | Hamada et al. | |
| 5,595,539 A | 1/1997 | Yamamoto | |
| 5,596,153 A | 1/1997 | Bulgrien et al. | |
| 5,598,745 A | 2/1997 | Tsuchiya | |
| 5,617,940 A | 4/1997 | Fukushima et al. | |
| 5,630,758 A | 5/1997 | Rivin | |
| 5,695,035 A | 12/1997 | Fukushima et al. | |
| 5,720,248 A | 2/1998 | Crofts | |
| 5,724,862 A | 3/1998 | Hannah et al. | |
| 5,725,429 A | 3/1998 | Yanagida | |
| 5,730,656 A | 3/1998 | Yamamoto | |
| 5,758,419 A | 6/1998 | Yanagida | |
| 5,871,401 A | 2/1999 | Maucher et al. | |
| 5,997,402 A | 12/1999 | Fukushima et al. | |
| 6,045,448 A | 4/2000 | Kern et al. | |
| 6,067,876 A | 5/2000 | Lohaus | |
| 6,131,477 A | 10/2000 | Gaydek et al. | |
| 6,149,525 A | 11/2000 | Fukushima et al. | |
| 6,238,293 B1 | 5/2001 | Peinemann | |
| 6,264,564 B1 | 7/2001 | Fukushima et al. | |
| 6,374,698 B1 | 4/2002 | Carlson et al. | |
| 6,450,065 B1 | 9/2002 | Eckel et al. | |
| 2002/0078791 A1 | 6/2002 | Eckel et al. | |
| 2003/0037636 A1 | 2/2003 | Kawata et al. | |
| 2003/0167875 A1 | 9/2003 | Polifke et al. | |

* cited by examiner

TORSIONAL COUPLING

TECHNICAL FIELD

This disclosure is directed to a torsional coupling. More particularly, this disclosure is directed to an engine having a torsional coupling.

BACKGROUND

Torsional vibrations resulting from engine harmonic excitation are common and lead to excessive noise and reduced gear life, which in turn, may cause premature engine failure. The harmonic excitation is produced by various torques applied to components within the engine, such as a crankshaft or cam shaft, during normal operation. For example, a torque applied to the crankshaft is constantly varied from a high torque, such as when a piston drives the crankshaft down and a low torque, such as when the crankshaft drives the piston upward in a cylinder block. The wide range of torques applied to the crankshaft induce harmonic excitation and torsional vibration in the engine.

Some systems for reducing torsional vibration include inertial masses that, due to centrifugal force, would generally circle the rotation axis of the coupling at the greatest distance possible. Torsional vibrations applied to the coupling cause a pendulum-like relative movement of the inertial masses within the coupling. The frequency of the relative movement can provide resistive inertia torques or provide effective isolation to reduce the torsional vibrations. The use of inertial masses with pendulum-like relative motion in these devices provide a speed sensitive tuning capability that can allow the devices to either track with or avoid engine harmonics as desired when engine speed changes.

U.S. Pat. No. 6,067,876 discloses a system for dampening torsional vibration using rolling bodies as coupling elements, movable relative to a hub disk, a primary flange, and a coverplate, all generally aligned parallel to each other. The hub disk includes cutouts extending in a radial direction. The primary flange and cover plate include matching recesses associated with each hub disk cutout. The cutout and recesses act as guide paths for a coupling body that may move within both the cutout and recesses, allowing deflection of the coupling body due to torsional vibration, thereby dampening vibrations. However, the generally parallel plates disclosed in the '876 patent may not be positioned to readily resist wear from the coupling body that may occur as a result of manufacturing related misalignments. This, in turn, may limit the life of the coupling and subsequently the engine system.

The present disclosure is directed to a system providing torsional vibration attenuation while potentially increasing the system's resistance to wear.

SUMMARY OF THE INVENTION

In one aspect, this disclosure is directed to a torsional coupling. The coupling includes a body having a circumference and defining a center axis. The body is rotatable about the center axis. The coupling also includes a ring including an inner diameter disposed about the circumference. The ring includes a ring contact surface having a first radius, and the ring is configured to rotate about the center axis. A coupling element is associated with the body and is configured to apply a centrifugal force radially outwardly from the circumference of the body when the body rotates. The coupling element includes a coupling element contact surface having a second radius, which is different than the first radius of the ring contact surface. The coupling element contact surface is in contact with the ring contact surface and is configured to apply a force against the ring contact surface to rotate the ring relative to the body and increase the effective stiffness of the torsional coupling as the rotational speed of the body increases.

In another aspect, this disclosure is directed to an engine including a cylinder block and a gear train. At least one gear of the gear train includes a body having a circumference and defining a center axis. The body is rotatable about the center axis. The gear also includes a ring having an inner diameter disposed about the circumference and having a ring contact surface having a first radius. The ring is also configured to rotate about the center axis. A coupling element is associated with the body and is configured to apply a centrifugal force radially outwardly from the circumference of the body when the body rotates. The coupling element includes a coupling element contact surface having a second radius which is different than the first radius of the ring contact surface. The coupling element contact surface is in contact with the ring contact surface and is configured to apply a force against the ring contact surface to rotate the ring relative to the body and increase the effective stiffness of the torsional coupling as the rotational speed of the body increases.

DETAILED DESCRIPTION

Reference will now be made in detail to exemplary embodiments that are illustrated in the accompanying drawings. Wherever possible, the same reference numbers will be used throughout the drawings to refer to the same or like parts.

Figure 1:
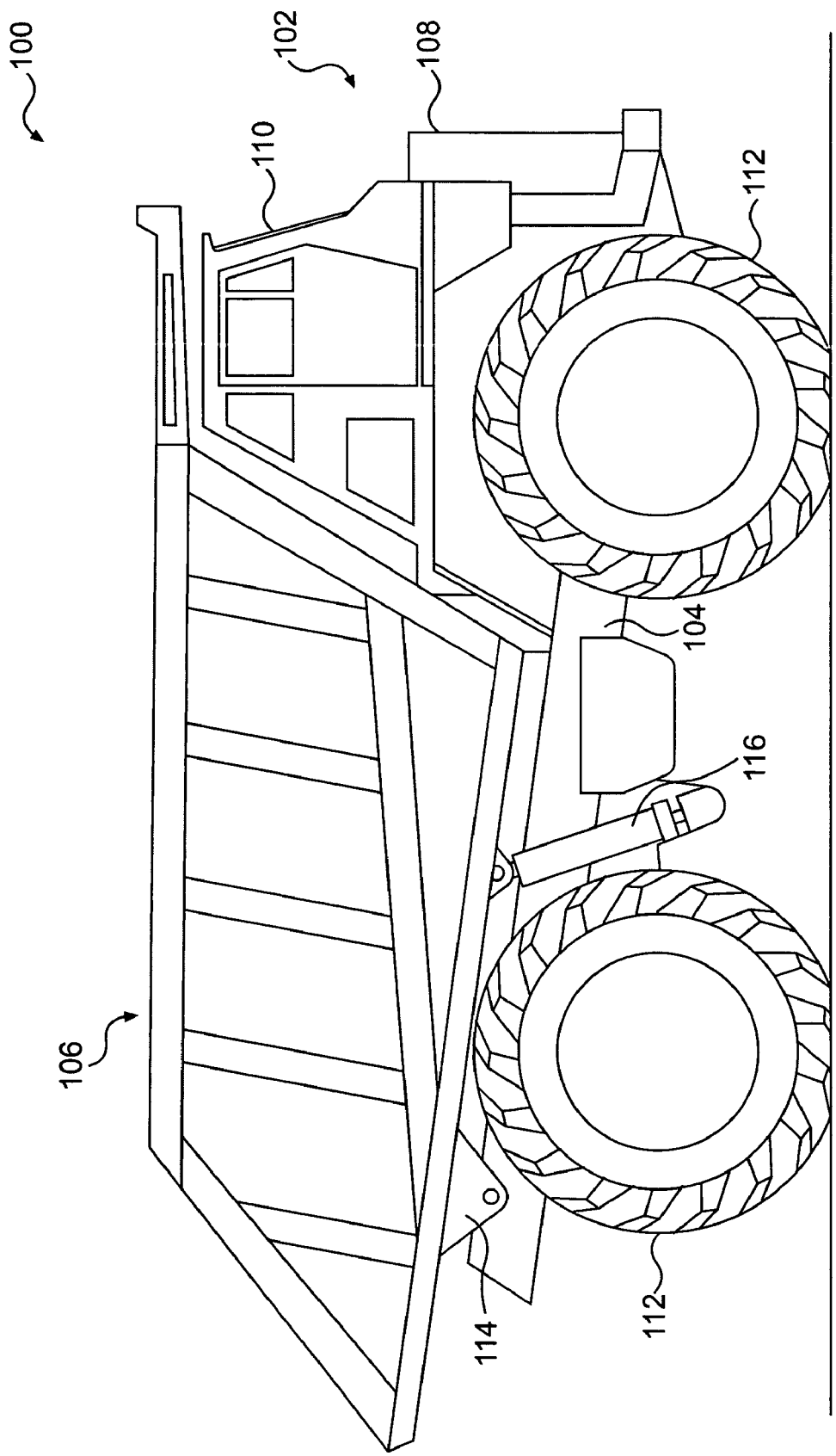
FIG. 1 is a pictorial representation of an exemplary work machine.

An exemplary embodiment of a work machine 100 is illustrated in FIG. 1. The exemplary work machine 100 includes a front end 102, a frame 104, and a payload container 106. The front end 102 may include an engine compartment 108 and an operator's cab 110. The engine compartment 108 may house an engine, a transmission, and/or other components used to power the work machine 100. The operator's cab 110 may include controls for operating and driving the work machine 100. The engine in the engine compartment 108 may drive wheels 112 attached to the frame 104, in a manner known in the art.

The payload container 106 may be connected to the frame 104 by a pivoting body support 114. The body support 114 may be located toward the rear end of the payload container 106. An actuator 116, such as a hydraulic cylinder, may extend between the frame 104 and the payload container 106 and may be actuated to raise a front end of the payload container 106 to pivot the payload container 106 about the body support 114 to dump a payload.

Figure 2:
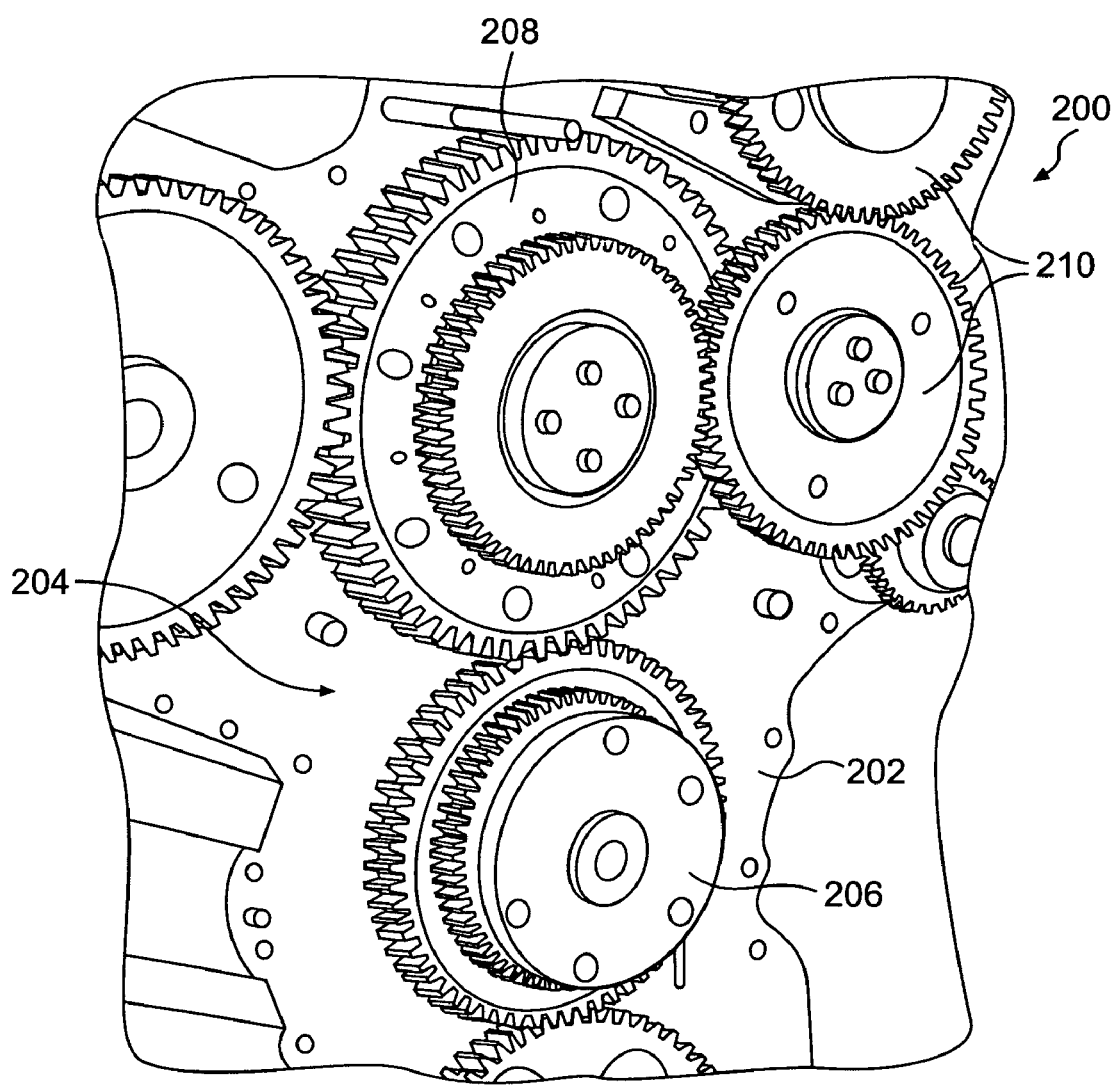
FIG. 2 is a pictorial representation of a portion of an exemplary engine including a gear train.

FIG. 2 shows an end portion of an exemplary engine 200. The engine 200 may be the engine in the engine compartment 108 on the work machine 100 of FIG. 1. The engine 200 includes a cylinder block 202 and a gear train 204. The cylinder block 202 may be configured in a manner known in the art to contain cylinders for pistons driving a crankshaft. The gear train 204 includes a crankshaft gear 206, a cluster idler 208, and idler gears 210. The idler gears 210 may be configured to drive a camshaft gear (not shown) at the top of the cylinder block 202.

Figure 3:
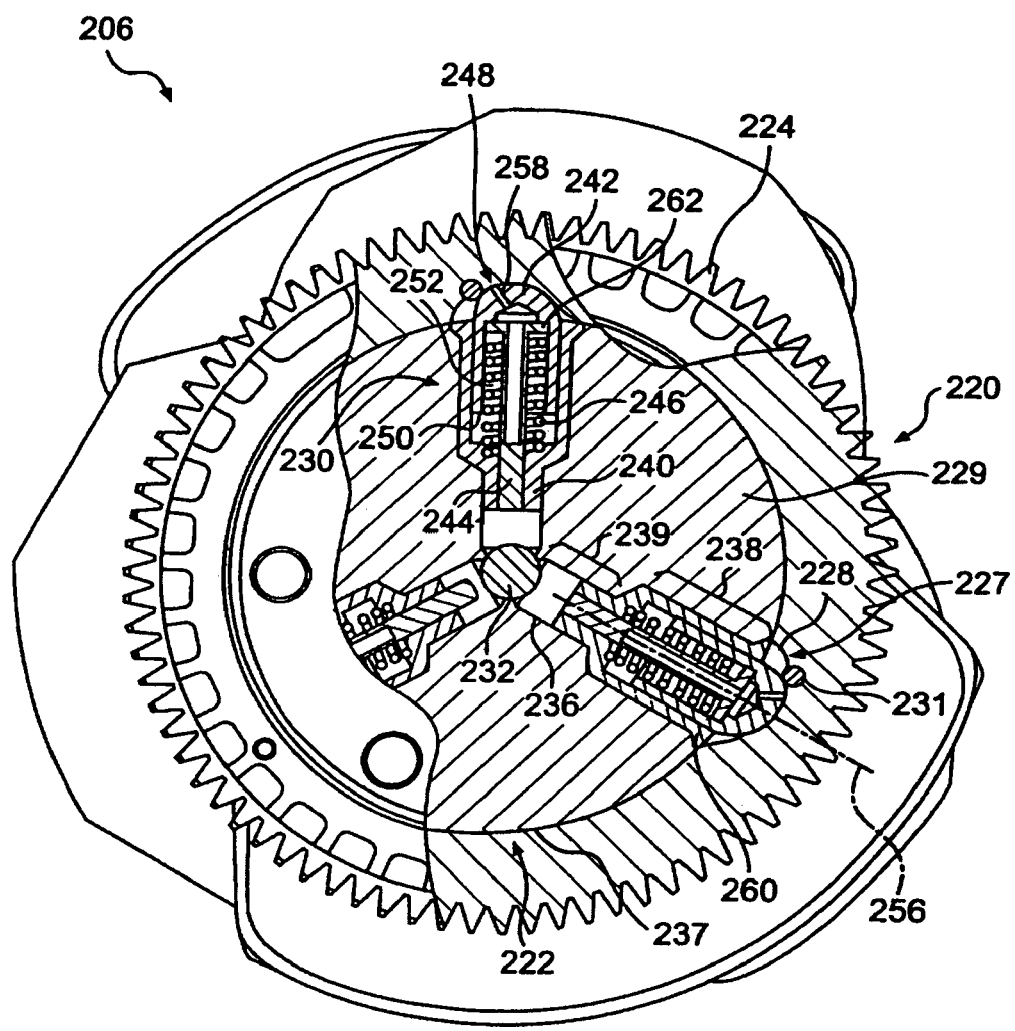
FIG. 3 is a pictorial representation of a section view of an exemplary crankshaft gear.
Figure 4:
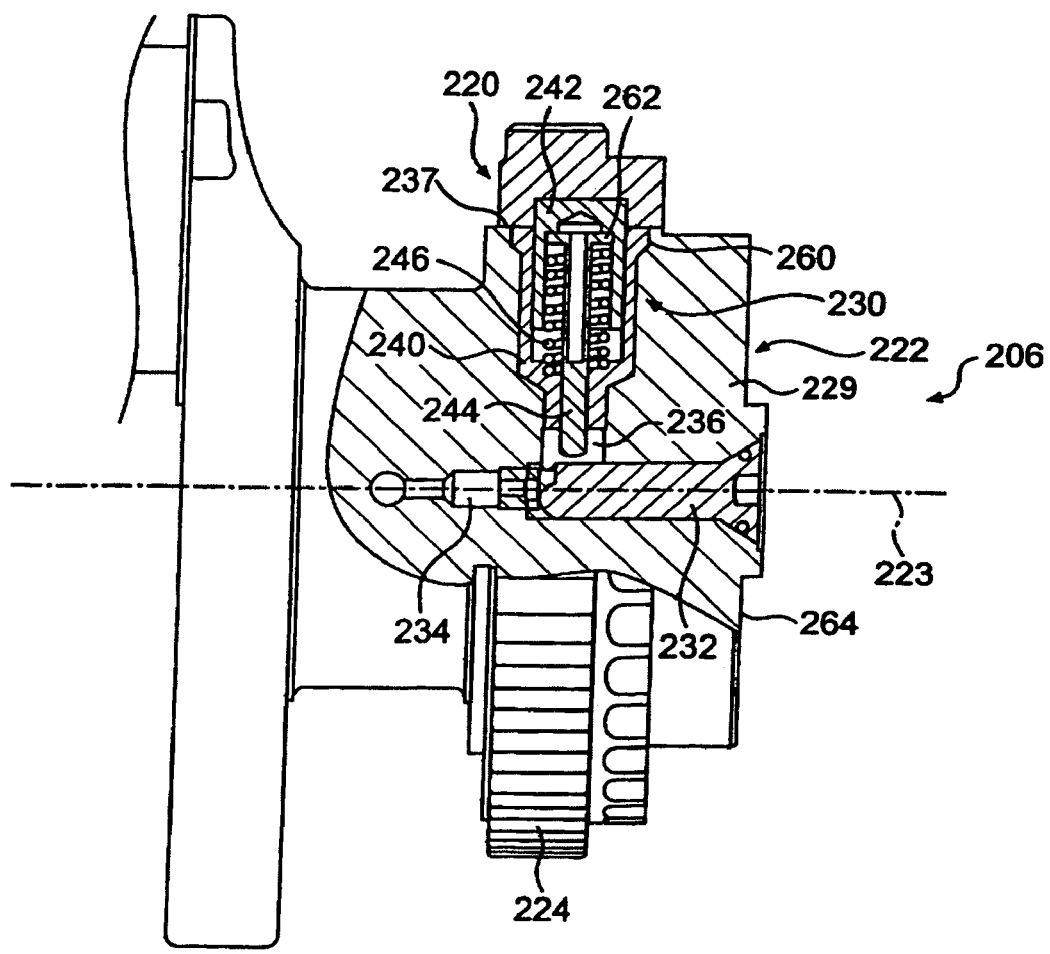
FIG. 4 is a pictorial representation of a side view of the exemplary crankshaft gear of FIG. 3.

The crankshaft gear 206 is shown in more detail and will be described with reference to FIGS. 3 and 4. FIG. 3 shows a front partial cross-sectional view, and FIG. 4 is a side partial cross-sectional view of the crankshaft gear 206. The crankshaft gear 206 includes a gear ring 220 disposed about a carrier 222 and is configured to rotate about an axis 223. The gear ring 220 and the carrier 222 are formed to be able to rotate relative to each other, based on torsional loads.

Figure 5:
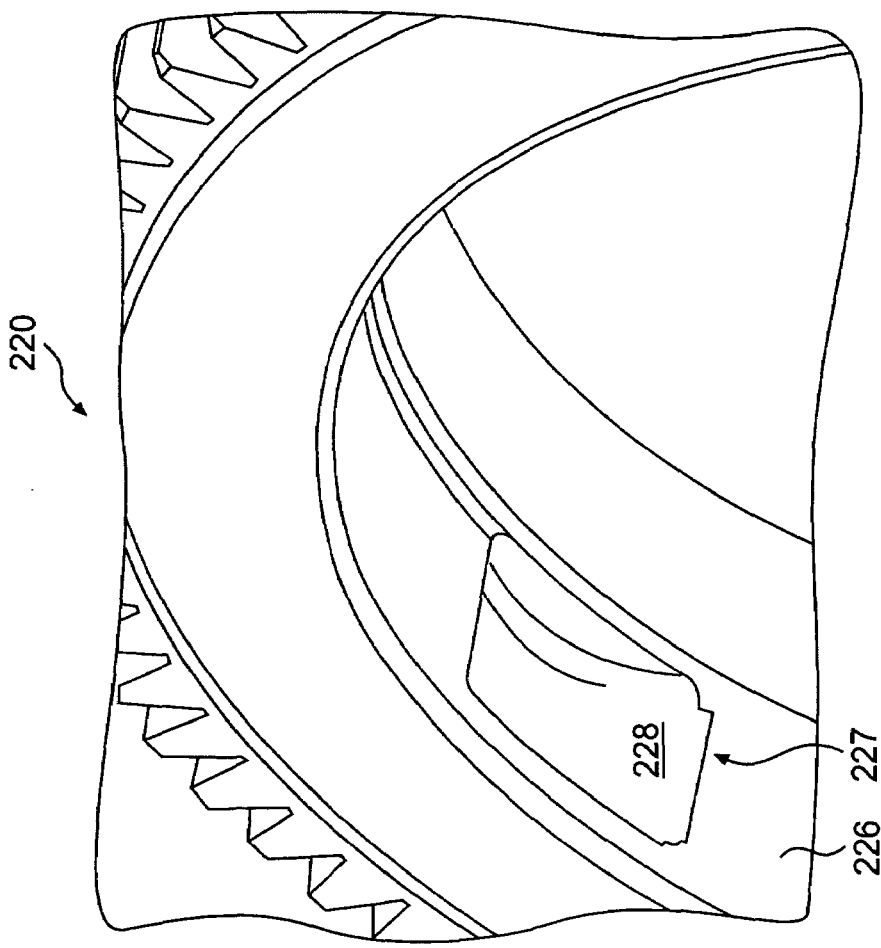
FIG. 5 is a pictorial representation of a gear ring of the exemplary crankshaft gear of FIG. 3.

The gear ring 220 may include teeth 224 configured to engage and drive adjacent gears in the gear train 204 of FIG. 2. A portion of the gear ring 220 is shown in FIG. 5. Referring to FIG. 5, the gear ring 220 includes an inner diameter surface 226 configured to fit around the carrier 222. The inner diameter surface 226 includes a keyway 227 formed therein. The keyway 227 may include a curved contact surface 228 having a preset radius. As seen in FIG. 3, a pin stop 231 in the keyway 227, of which at least a portion extends across the contact surface 228, is configured to limit the rotation of the gear ring 220 about the carrier 222, as explained below.

Returning to FIGS. 3 and 4, the carrier 222 may be rigidly connected to and formed integrally with a crankshaft (not shown), that may extend into the cylinder block 202 of FIG. 2. The carrier 222 may include a body 229, a piston assembly 230, and a center pin 232. The body 229 may be formed in a manner known in the art and, in addition, may include a center bore 234 and radially extending piston bores 236. In the exemplary embodiment shown, the body 229 includes three piston bores 236. However, any number of piston bores 236 may be included in the body 229. Also, in the embodiment shown, the piston bores 236 extend radially inward from an outer circumference 237 of the body 229 and connect to the center bore 234. In the embodiment shown, the piston bores 236 are formed to have a large first diameter 238 extending radially inward from the circumference 237 and a second relatively smaller diameter 239 connecting to the center bore 234. It should be noted, however, that the piston bores 236 need not connect with the center bore 234, and may have other configurations than the one shown.

The piston assemblies 230 may be disposed within the piston bores 236. Each piston assembly 230 may include a liner 240, a piston 242, a pin 244, and a spring 246. The liner 240 is configured to fit within the piston bore 236 in the carrier 222, and may be configured to house the piston 242, the pin 244, and the spring 246. In the exemplary embodiment shown, the liner 240 is a hollow, tubular structure open at each end and may be designed with a profile that tracks the large first and smaller second diameters 238, 239 of the associated piston bore 236. The liner 240 may have a hardened surface, and the bottom of the liner 240 may be threaded into the piston bore 236 in the body 229. A lip 260 may provide a means to stretch the component so that the threaded portion is not prone to coming loose. The liner 240 may be secured within the piston bore 236 using any known method, including, for example, a press or interference fit and/or an adhesive. Alternatively, the liner 240 may be loosely fit into the piston bore 236 being restrained by gear ring 220, or left out completely with the bore for the piston being directly in the body 229.

The piston 242 is a free weight that is configured to move radially inward and outward within the liner 240 and may be formed to have a tight clearance with the liner 240. The mass of the piston 242 may be selected based on the amount of desired displacement, the torque to be transmitted, the expected gear speed, and the diameter of the body 229. The piston 242 is disposed in the liner 240 and is configured to extend radially beyond the outer circumference 237 of the body 229 and into the keyway 227 of the gear ring 220. Thus, the piston 242 operates as a coupling element between the gear ring 220 and the body 229. The piston 242 includes a distal end 248 and a proximal end 250 with a bore 252 in the proximal end that is configured to receive the pin 244 and the spring 246. The piston 242 is shown and described in greater detail with reference to FIG. 6.

Figure 6:
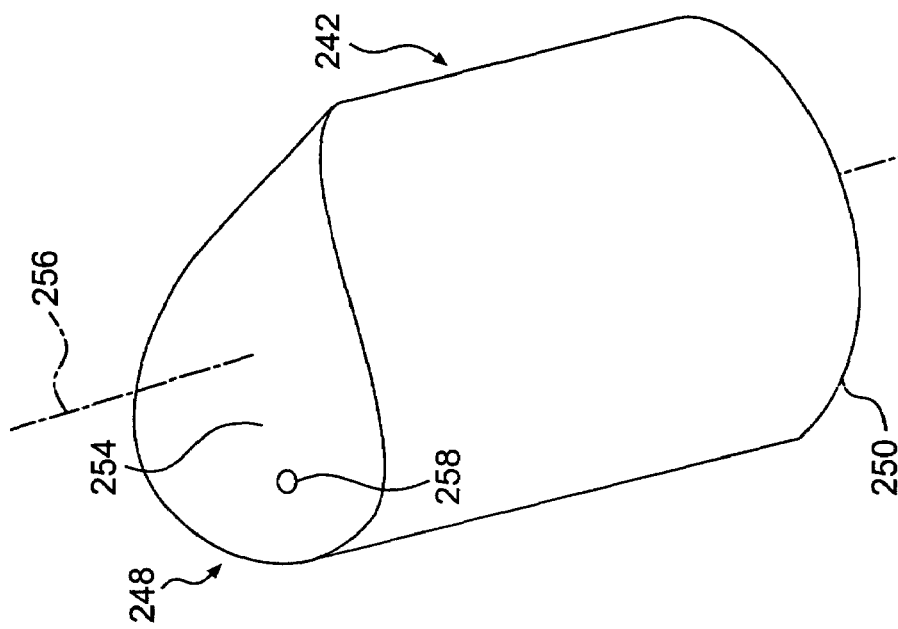
FIG. 6 is a pictorial representation of a piston of the exemplary crankshaft gear of FIG. 3.

Referring to FIG. 6, the distal end 248 of the piston 242 may include a contact surface 254 configured to come into contact with the contact surface 228 of the keyway 227. It should be noted that the radius of the contact surface 254 will generally be different than the radius of the contact surface 228 of the keyway 227. Thus, the contact surface 254 of the piston 242 is configured to contact the contact surface 228 of the keyway 227 along a contact line. In addition, the piston 254 defines, and is rotatable about, a piston axis 256. Thus, the piston 242 may slightly rotate within the liner 240 to substantially maintain the line contact with the recess 227, providing the largest possible area of contact between the two contact surfaces 228, 254.

In the exemplary embodiment shown, a passageway 258 extends from the bore 252 through the contact surface 254 of the piston 242. The passageway 258 allows oil to flow from the bore 252 to the contact surface 254, which may serve to cool and lubricate the contact surfaces 254, 228, thereby potentially reducing pitting and spalling. In addition the size of the passageway 258 may be selected to provide fluid dampening by limiting the flow through the passageway 258 to or from the keyway 227 during dynamic oscillations.

The pin 244 extends from inside the bore 252 in the piston 242 to a portion of the liner disposed in the second smaller second diameter 239 of the piston bore 236. The pin 244 may include a shoulder 262 that contacts an interior of the piston 242 and may have a length such that the pin 244 limits the radial movement of the piston 242 in an inward direction by contacting the center pin 232 while maintaining the piston 242 in the keyway 227.

The spring 246 is configured to provide a biasing force to the piston 242 and is disposed within the bore 252 in the piston 242. Accordingly, the piston 242 is biased radially outward relative to the liner 240 and the body 229. This helps bias the piston 242 into the keyway 227.

The center pin 232 extends from a front face 264 of the body 229 into the center bore 234. The center pin 232 is configured to fill the center bore 234 and to limit the travel of the pin 244 through the piston bore 236 into the center bore 234. The center pin 232 may be configured to be removed from the body 229 when it is desired to remove the gear ring 220 from the carrier 222. Removal of the center pin 232 allows the pin 244 to extend into the center bore 234, thereby lowering the overall height of the piston assembly 230. In one exemplary embodiment, oil may flow through the center bore 234 to the piston bores 236 to provide lubrication and cooling to the piston assembly 230 and/or the gear ring 220.

In one exemplary embodiment, pressurized oil may be provided in the piston bores 236 to apply a radial force, in addition to the centrifugal force. In this embodiment, the center bore 234 and the piston bores 236 may be in fluid communication with a pressurized fluid source. The pressurized fluid may be fed to the center bore 234 from a non-rotating location, such as the cylinder block 202 (FIG. 2) or other non-rotating support, and through bearings (not shown) supporting the crankshaft 206. The fluid pressure may be controlled and varied to apply a pressure against the piston 242. This pressure may be applied, in addition to the centrifugal force generated as the crankshaft gear 206 rotates, to control the radial force and the interaction between the piston 242 and the contact surface 228 of the keyway 227.

INDUSTRIAL APPLICABILITY

The piston assembly 230 and the gear ring 220 may aid in attenuating engine harmonic excitations and their accompanying vibration and noise while avoiding an engine harmonic resonance. As the crankshaft gear 206 rotates, a centrifugal force drives the piston 242, which has a predetermined mass, outwardly in a radial direction. The contact surface 254 of the piston 242 contacts the contact surface 228 of the keyway 227 in the gear ring 220. Because the radii of the contact surfaces 254, 228 differ, the contact is a line contact that may be substantially parallel to the axis of rotation 223 of the body 229. In FIG. 3, this contact line would appear as a contact point. From that perspective, the contact point occurs where the piston contact surface 254 and the keyway contact surface 228 coincide and are tangential to each other. Therefore, the contact point, the center point of the radius of the piston contact surface 254, and the center point of the radius of the keyway contact surface 228 all fall on the same line. Any relative motion between the center point of the radius of the keyway contact surface 228 and the center point of the radius of the piston contact surface 254 then defines a pendulum like motion of the piston surface radius center point about the keyway surface radius center point, and the contact point is located along the line that extends through the two center points. The total force transmitted through this surface contact may be substantially along this line. Therefore, relative to the axis of rotation 223, the force vector acting between the piston 242 and the gear ring 220 is made up of a radial component and a tangential component that, when combined, creates a total force vector that follows the line described above.

The centrifugal force applied by the piston 242 increases with rotational speed squared. This radial force may be reacted through the contact line between the piston 242 and the contact surface 228 of the keyway 227 in the gear ring 220. Since the relative rotational positions of the piston 242 in the body 229 and the gear ring 220 define the line of action of the total force vector, the magnitude of the tangential force vector is substantially proportional to the radial force vector for a given relative rotational position at any rotational speed, the greater the relative displacement, the greater the tangential proportion. Accordingly, as the radius of one contact surface applies a force against the other contact surface, the different radii create a tangential force vector that also increases with rotational speed squared, and produces the transmitted torque. In turn, if the torque applied through the gear is still greater than the produced torque, the excess torque causes the gear ring 220 to rotate further relative to the body 229, shifting the position of the line of contact on the contact surfaces 228, 254. As the position of the line of contact shifts, the direction of the total force vector shifts increasing the proportion of the force vector that is tangential, and further increasing the reactive torque applied to the gear ring 220. As the centrifugal force increases, the tangential force vector between the contact surfaces 254, 228 increases, thereby increasing the effective stiffness of the coupling between the gear ring 220 and the carrier 222. It should be noted that the pin stop 231 may limit the rotation of the gear ring 220 in the reverse direction by effectively blocking the reverse movement of the piston 242.

Because, as explained above, the centrifugal force increases by rotational speed squared, the effective stiffness also increases with rotational speed squared. When coupling components with fixed mass moments of inertia, this results in a natural frequency that is substantially proportional to the speed. Because the natural frequency can change proportionally with the speed, and because engine excitation harmonics also track with speed, the coupling can be designed to substantially avoid an engine harmonic resonance within the normal operating speeds of the engine.

Because the piston 242 is at least slightly rotatable within the liner 240 about the piston axis 256, the line of contact between the contact surface 254 of the piston 242 and the contact surface 228 of the keyway 227 may be substantially maintained. This, in turn, may reduce wear of the contact surfaces 254, 228 by distributing the applied loads along the contact line. Furthermore, because the piston 242 can rotate slightly within the liner 240, the contact surface can more easily accommodate irregularities or imperfections in the contact surfaces while still generally maintaining the line of contact.

The passageway 258 may also aid in prolonging the life of the gear ring and piston by allowing the contact surfaces 228, 254 to be immersed in fluid. As the piston 242 and gear ring 220 rotate, centrifugal force pulls fluid through the passageway 258 to the keyway 227. The fluid lubricates the contact surfaces 228, 254, thereby reducing the chance of pitting and spalling. Furthermore, the fluid in the keyway 227 may provide additional dampening between components of the crankshaft gear 206. To do this, the size of the passageway 258 may be selected to limit the flow of fluid. Accordingly, the fluid in the keyway 227 may not be able to quickly flow from the keyway 227 when the ring gear vibrates or jostles. This limited flow may inhibit rapid motion of the piston 242 and thereby the rapid relative motion of the gear ring 220 to the carrier 222, providing the dampening.

In one exemplary embodiment, pressurized fluid is fed to the piston bores 236 to provide pressure against the proximal end 250 of the piston 242 to increase the radial force. By varying the fluid pressure, the radial force may be controlled. This may be beneficial when the crankshaft gear rotates at relatively slow speeds, where centrifugal force from the piston 242 may not be high enough to provide the desired torque capacity. Therefore, as the radial force generates a proportional tangential force at a given deflection, the effective torsional stiffness may be varied by controlling the oil pressure against the proximal end of the piston 242.

The coupling described herein may be applied as an actual torque transmitting coupling element or as a tuned harmonic damping device. As a damping device, the outer ring acts as an inertia mass with the coupling components providing the desired stiffness characteristics that will be tuned to vary with speed. In addition, the coupling element described herein is configured to increase the effective stiffness of the torsional coupling as the rotational speed of the body increases. This increase in stiffness with speed allows the gear train system to avoid a significant torsional resonance in the operating speed range while effectively attenuating most engine excitation harmonics.

Because the coupler disclosed herein reduces gear vibration and engine noise, it allows the gears to be made at looser specifications and of different materials, thereby providing less costly parts with a longer life. Furthermore, the feature of a fixed order natural frequency behavior could be used in many other applications where resonance frequencies with speed dependent excitation harmonics should be avoided over a wide speed range. However, it should be noted that the disclosed coupler need not be used only with a gear, but may be used at any coupling where torque is applied, including, for example, a coupling on a driveline or an engine torsional vibration damper.

Further, although the coupler is disclosed as being on an engine for a work machine, the engine could be used on any vehicle, including on-road trucks, automobiles, boats, or other moving vehicles. In addition, the disclosed engine may not be associated with a work machine but may be a stationary engine, such as may be used to generate power.

It will be apparent to those skilled in the art that various modifications and variations can be made in the disclosed embodiments without departing from the scope of the invention. Other embodiments of the invention will be apparent to those skilled in the art from consideration of the specification and practice of the invention disclosed herein. It is intended that the specification and examples be considered as exemplary only, with a true scope of the invention being indicated by the following claims and their equivalents.

What is claimed is:

1. A torsional coupling, comprising:
   a body having a circumference and defining a center axis, the body being rotatable about the center axis;
   a ring including an inner diameter disposed about the circumference, the inner diameter including a keyway having a ring contact surface defining a first radius, the ring being configured to rotate about the center axis; and
   a coupling element associated with the body and being configured to apply a centrifugal force radially outwardly from the circumference of the body when the body rotates, wherein the coupling element includes a coupling element contact surface having a second radius substantially different than the first radius of the ring contact surface, the coupling element contact surface being in contact with the ring contact surface and being configured to apply the force against the ring contact surface to rotate the ring relative to the body and wherein the effective stiffness of the torsional coupling increases as the rotational speed of the body increases.

2. The coupling of claim 1, wherein the coupling element defines a coupling element axis that is nonparallel to the center axis, the coupling element being at least partially rotatable about the coupling element axis in a manner to maintain a line contact with the ring contact surface.

3. The coupling of claim 1, wherein the body includes at least one radial bore formed in the circumference, the coupling element being disposed at least partially in the bore.

4. The coupling of claim 3, wherein the coupling element is a piston.

5. The coupling of claim 3, wherein the body is configured to flow fluid to the at least one radial bore.

6. The coupling of claim 5, wherein the coupling element includes a passageway allowing fluid to flow to the keyway.

7. The coupling of claim 1, including a pin stop at least partially disposed in the keyway, the pin stop being configured to contact the coupling element to limit the relative rotation of the ring with respect to the body.

8. The coupling of claim 1, wherein the coupling element is a piston of a piston assembly, the piston assembly including a spring associated with the piston and disposed to bias the piston outwardly from the center axis.

9. The coupling of claim 1, wherein the ring includes gear teeth configured to transfer a rotation force from the body to an adjacent gear.

10. The coupling of claim 1, including a fluid providing pressure against a proximal end of the coupling element, the fluid affecting the force applied against the ring contact surface.

11. The coupling of claim 10, wherein the fluid pressure is variable.

12. The coupling of claim 1, wherein the coupling element contact surface remains substantially within the keyway, maintaining a continuous power transfer between the body and the ring.

* * * * *